(12) United States Patent
Jendick

(10) Patent No.: US 6,576,871 B1
(45) Date of Patent: Jun. 10, 2003

(54) METHOD AND DEVICE FOR DUST PROTECTION IN A LASER PROCESSING APPARATUS

(75) Inventor: Manfred Jendick, Recklinghausen (DE)

(73) Assignee: Rexam AB, Malmo (SE)

( * ) Notice: Subject to any disclaimer, the term of this patent is extended or adjusted under 35 U.S.C. 154(b) by 0 days.

(21) Appl. No.: 09/723,327

(22) Filed: Nov. 28, 2000

Related U.S. Application Data
(60) Provisional application No. 60/194,031, filed on Apr. 3, 2000.

(51) Int. Cl.$^7$ ............................................. B23K 26/14
(52) U.S. Cl. ............................. 219/121.84; 219/121.67
(58) Field of Search ...................... 219/121.84, 121.67, 219/121.68

(56) References Cited

U.S. PATENT DOCUMENTS

| | | |
|---|---|---|
| 2,641,998 A | 6/1953 | Donald |
| 2,648,278 A | 8/1953 | Neander |
| 3,001,787 A | 9/1961 | Socke |
| 3,182,994 A | 5/1965 | Huth |
| 3,549,733 A | 12/1970 | Caddell |
| 3,626,141 A | 12/1971 | Daly ..................... 219/121.84 |
| 3,692,223 A | 9/1972 | Laigle et al. |
| 3,854,647 A | 12/1974 | Mittendorf |
| 3,863,823 A | 2/1975 | Allred |
| 3,866,398 A * | 2/1975 | Vernon, Jr. et al. ..... 219/121.84 |
| 3,898,417 A | 8/1975 | Atkinson |

(List continued on next page.)

FOREIGN PATENT DOCUMENTS

| | | |
|---|---|---|
| CA | 2168435 | 2/1995 |
| CA | 2232871 | 3/1997 |
| DE | 2052 512 | 4/1972 |
| DE | 89 00 453 | 4/1989 |
| DE | 38 22 097 A1 | 1/1990 |

(List continued on next page.)

OTHER PUBLICATIONS

Brochure entitled, "This is PLM Fosie," issued by Swedish Company, PLM Fosie AB (mid 1990's).
JP 07004675, Patent Abstracts of Japan (CD–ROM), Unexamined Applications, vol. 95, No. 1.
JP 07045111, Patent Abstracts of Japan (CD–ROM), Unexamined Applications, vol. 95, No. 2.

(List continued on next page.)

*Primary Examiner*—Geoffrey S. Evans
(74) *Attorney, Agent, or Firm*—Pillsbury Winthrop LLP

(57) ABSTRACT

A method of protecting a laser unit from dust during laser processing of a target in a processing area includes establishing an essentially ambient pressure at the processing area, and directing a longitudinal gas flow towards the processing area to establish in a first region intermediate the processing area and the laser unit, thereby effectively preventing dust from moving towards the laser unit and at the same time minimizing the forces acting on the target. A corresponding dust protection device defines a channel extending from a radiation inlet opening, facing the laser unit, to a radiation outlet opening, facing the target. A gas control unit communicates with the channel to feed gas thereto through at least one gas inlet aperture spaced from the radiation outlet opening. Simultaneously, the gas control unit removes gas from the channel through at least one gas outlet aperture adjacent to the radiation outlet opening.

43 Claims, 6 Drawing Sheets

U.S. PATENT DOCUMENTS

| | | |
|---|---|---|
| 4,304,981 A | 12/1981 | Gappa |
| 4,322,016 A | 3/1982 | Barrash |
| 4,323,755 A | 4/1982 | Nierenberg |
| 4,363,179 A | 12/1982 | Ruemer, Jr. et al. |
| 4,375,025 A | 2/1983 | Carlson |
| 4,380,129 A | 4/1983 | Barrash |
| 4,405,852 A | 9/1983 | Bononi |
| 4,431,124 A | 2/1984 | Campbell et al. |
| 4,459,910 A | 7/1984 | Taube |
| 4,476,781 A | 10/1984 | Kubacki et al. |
| 4,517,436 A | 5/1985 | Lawrence |
| 4,564,739 A | 1/1986 | Mattelin |
| 4,635,545 A | 1/1987 | Kubacki |
| 4,675,500 A | 6/1987 | Kunz |
| 4,765,532 A | 8/1988 | Uomoti et al. |
| 4,880,137 A | 11/1989 | Wells |
| 4,910,739 A | 3/1990 | Sheng |
| 5,202,199 A | 4/1993 | Mitzutani |
| 5,206,496 A | 4/1993 | Clement et al. |
| 5,215,864 A | 6/1993 | Laakmann |
| 5,235,454 A | 8/1993 | Iwasaki |
| 5,248,878 A | 9/1993 | Ihara |
| 5,329,090 A | 7/1994 | Woelki et al. |
| 5,359,176 A * | 10/1994 | Balliet, Jr. et al. ...... 219/121.84 |
| 5,465,780 A | 11/1995 | Muntner et al. |
| 5,552,574 A | 9/1996 | Merlin et al. |
| 5,570,384 A | 10/1996 | Nishida et al. |
| 5,578,120 A | 11/1996 | Takahashi et al. |
| 5,593,606 A | 1/1997 | Owen et al. |
| 5,649,363 A | 7/1997 | Rankin, VI |
| 5,653,900 A | 8/1997 | Clement et al. |
| 5,660,516 A | 8/1997 | Artrip |
| 5,660,747 A | 8/1997 | Drouillard et al. |
| 5,719,372 A | 2/1998 | Togari et al. |
| 5,782,024 A | 7/1998 | Pausch |
| 5,817,243 A | 10/1998 | Shaffer |
| 5,854,805 A | 12/1998 | Reid et al. |
| 5,906,760 A * | 5/1999 | Wang et al. ........... 219/121.84 |
| 6,002,098 A | 12/1999 | Pircher et al. |
| 6,080,958 A | 6/2000 | Miller et al. ........... 219/121.68 |

FOREIGN PATENT DOCUMENTS

| | | |
|---|---|---|
| DE | 4106151 | 11/1991 |
| DE | 4143339 | 3/1993 |
| DE | 43 39 321 A1 | 6/1994 |
| DE | 4339321 | 6/1994 |
| DE | 4322252 | 1/1995 |
| DE | 44 35 531 A1 | 4/1995 |
| DE | 43 38 774 A1 | 5/1995 |
| DE | 44 05 203 A1 | 8/1995 |
| DE | 196 39 619 A1 | 3/1997 |
| DE | 19607621 | 9/1997 |
| DE | 298 16 109 U1 | 11/1998 |
| EP | 0 040 929 | 12/1981 |
| EP | 0 085 484 A1 | 8/1983 |
| EP | 0377915 A2 | 7/1990 |
| EP | 0482776 | 4/1992 |
| EP | 208 175 B1 | 3/1993 |
| EP | 0 618 037 A1 | 10/1994 |
| GB | 218563 | 7/1987 |
| JP | 58-187091 | 11/1983 |
| JP | 61-86305 | 5/1986 |
| JP | 2-20684 A * | 1/1990 ............ 219/121.84 |
| JP | 7-53099 A | 2/1995 |
| JP | 8-53121 | 2/1996 |
| JP | 9-192870 A * | 7/1997 |
| JP | 10-113786 A * | 5/1998 |
| JP | 11-58050 A * | 3/1999 |
| JP | 11-216589 A * | 8/1999 |
| WO | WO 93/04943 | 3/1993 |
| WO | WO 93/08541 | 4/1993 |
| WO | WO 95/04342 | 2/1995 |
| WO | WO 97/11288 | 3/1997 |
| WO | WO 98/53949 | 12/1998 |
| WO | WO 99/09853 | 3/1999 |
| WO | WO 00/03832 | 1/2000 |

OTHER PUBLICATIONS

JP 04091875, Patent Abstracts of Japan, Abstract of DE 4106151.

Patent Abstracts of Japan, vol. 8, No. 25, E–225 Abstract of JP 58–187091A (Kanebo K.K.), Nov. 1, 1993.

Abstract—JP 0080047784 AA.

Abstract—JP 0080053121 AA.

Abstract—AU 9481794 A.

Culkin & Kugler, "Industrial Laser Processing", The Photonics Design & Applications Handbook, Book 3, 37th International Edition, 1991, pp. H–216–227.

Dr. A.F.H. Kaplan, EuroLaser Academy, 1996/1997, Section "Laser Marking and Scribing", pp. 1–13.

W.M. Steen, "Laser Material Processing", Second Edition, Chapter "6.17. Laser Marking", Springer Verlag, 1998, pp. 263–265, 271.

* cited by examiner

METHOD AND DEVICE FOR DUST PROTECTION IN A LASER PROCESSING APPARATUS

This aplication claims the benefit of U.S. Provisional Application No. 60/194,031, filed Apr. 3, 2000.

TECHNICAL FIELD

The present invention relates to laser material processing, and more specifically to a method and a device for protecting a laser unit from dust or debris produced during laser processing of a target or substrate in a processing area.

The present invention is especially useful in connection with an apparatus for laser engraving or marking. Therefore, the technical background of the invention, and objects and embodiments thereof, will be described with reference to such laser engraving apparatus. However, the invention may also be applicable in connection with equipment for any other type of laser material processing, such as other laser surface treatment, laser cutting and laser welding.

BACKGROUND ART

Generally, for example as disclosed in DE-A1-43 38 774 or DE-A1-44 05 203, a laser engraving apparatus comprises a laser unit and a target guiding device which is disposed below the laser unit and adapted to guide a target past the laser unit. The laser unit includes a laser head being adapted to generate laser radiation, and a control head being adapted to direct and focus the laser radiation on the target to be provided with laser engraved markings. When the target is being laser processed, material is removed from the target in the form of small particles. These particles, or debris, collectively produce dust that either adheres to the surface of the target or, by the impact of the laser radiation, flies away from the target. In such an apparatus, it is important to prevent dust from entering the laser unit, since the presence of dust potentially could lead to deterioration or destruction of any optical components included therein.

In a laser engraving apparatus disclosed in EP-A1-0 085 484, a not further described air-curtain arrangement is used in connection with a depending bellow intermediate a laser unit and an underlying engraving area to prevent ingress of dust into the laser unit. Such an arrangement might be sufficient to prevent dust contained in the surrounding air from entering the laser unit. However, dust or debris which is produced at the engraving area, as a result of material being removed from the target, might still enter the laser unit. This problem is enhanced in high-precision engraving, when the distance from the laser unit to the engraving area has to be reduced, thereby bringing the source of dust generation closer to the sensitive laser unit.

Evidently, the situation would be even worse if the laser unit were to be arranged beneath the engraving area, since gravity would promote an accumulation of dust on the laser unit. When two opposite sides of a target are to be provided with engraved markings, especially when the markings on the two sides must be precisely located with respect to one another, it is advantageous, or even necessary, to engrave the target from both sides. If the target has to be turned upside-down between the engraving operations, the positional relationship between the opposite sides is easily lost. This problem is accentuated when a continuous web of material is being engraved, since the turning operation will be complicated to achieve and requires a great deal of space. Such a turning operation is often inconsistent with high production speeds. Also, in using two consecutive engraving stations to engrave one respective side of the web, and an intermediate turning station for turning the web, the distance between the engraving stations must be so large that it is difficult to maintain a positional relationship between the markings on the opposite sides of the web.

Further, if the target to be provided with laser engraved markings is small, light-weight and/or made of flexible material, a conventional air-curtain arrangement might undesirably alter the position or shape of the target during the engraving operation.

SUMMARY OF THE INVENTION

An object of the present invention is to eliminate, or at least alleviate, the drawbacks mentioned above and to provide an improved method and device for protecting a laser unit from dust during processing of a target or substrate in a processing area. More specifically, the invention aims at essentially eliminating ingress of dust into the laser unit while still allowing for high-precision laser processing of all kinds of targets.

It is also an object of the invention to provide for minimum influence on the position and shape of the target during processing thereof in the processing area.

A further object of the invention is to provide for laser processing from either side, or both sides, of a target.

These and other objects, which will appear from the following description, have now been achieved by a method and a device as defined in the appended independent claims. Preferred embodiments of the invention are set forth in the dependent claims.

By establishing an ambient pressure at the processing area, forces acting on the target can be minimized. Thus, with respect to the dust protection measures, any kind of feasible target can be processed, even targets that are small, light-weight and/or flexible. By establishing a longitudinal gas flow directed towards the processing area in a first region intermediate the processing area and the laser unit, dust is effectively prevented from moving towards the laser unit. Further, the method and device of the invention allows for laser processing from beneath a target, since the longitudinal gas flow in the first region can be adjusted to counteract the gravitational driving force of the dust produced on the target during processing.

In one embodiment, gas is simultaneously removed adjacent to the processing area and fed to the first region intermediate the processing area and the laser unit, thereby establishing the ambient pressure at the processing area and the gas flow directed towards the processing area. Preferably, the longitudinal gas flow is accelerated towards the processing area, to further increase the ability of the gas flow to counteract the gravitational driving force of the dust.

In another embodiment, a housing is arranged intermediate the laser unit and the processing area. A channel extends within the housing from a radiation inlet opening which is facing the laser unit, and a radiation outlet opening which is facing, and generally is located close to, the processing area. Gas is simultaneously fed to and removed from the channel at separated locations therein. By balancing the feeding and removal rates of gas in the housing, it is assured that the pressure at the radiation outlet opening, and in practice also at the processing area, is maintained at essentially ambient pressure. In a simple and efficient arrangement, the balancing of the feeding and removal rates of gas is effected by controlling the gas removal rate such that essentially ambient pressure is established at the processing area.

It is preferred that the removal of gas is effected adjacent to the radiation outlet opening, since such removal will facilitate the control of the pressure at the radiation outlet opening. Furthermore, generated dust can be removed from the region around the radiation outlet opening. Thus, the target can be cleaned from dust while being processed.

Preferably, the longitudinal gas flow is established over essentially a full cross-section of the channel in the first region. In one embodiment, this is achieved by feeding gas into the first region in at least one pair of opposite inlet gas flows, which cooperate to form the longitudinal gas flow directed towards the processing area. Preferably, the opposite inlet gas flows together sweep a full cross-section of the channel in the first region. On entering the channel, the opposite inlet gas flows are preferably directed essentially perpendicular to the longitudinal center line of the channel, so that they meet and together form the longitudinal gas flow over the whole cross-section of the channel.

In another embodiment, a peripheral gas flow is separately established along a channel periphery in the first region. Preferably, this is achieved by directing one or more gas jets from the channel periphery onto the processing area. Such gas jets will counteract the formation of any wake regions close to the channel walls, particularly in any corners thereof. Additionally, such gas jets can assist in moving the generated dust from the target to the radiation outlet opening where it is efficiently removed.

Preferably, gas is removed in at least two diametrically opposite directions adjacent to the radiation outlet opening. This arrangement allows for sufficient control of the pressure at the processing area, as well as efficient removal of dust from the processing area.

In a further embodiment, a pressure barrier is established in a second region in the channel, preferably intermediate the first region and the laser unit. The pressure barrier, i.e. a region of higher pressure as seen from the processing area, will assist in preventing dust from reaching the laser unit.

In an additional embodiment, a lateral gas flow is established in a third region in the channel, preferably intermediate the first region and the laser unit. The lateral gas flow is established between opposite openings in a side wall portion of the channel, preferably in the form of a sheet of gas that sweeps a full cross-section of the channel in the lateral direction. Any dust passing the first region, and the second region if present, has been significantly decelerated and will be effectively removed by such a lateral gas flow. Preferably, the lateral gas flow is established by balancing the associated gas feeding and removal rates, so that the lateral gas flow is prevented from interacting with, and potentially disturbing, the flow field in the first region.

In one embodiment, the channel has a non-circular cross-section, at least in the first region. This configuration will prevent any formation a swirling gas motion in the first region. Such a swirling gas motion, for example around the longitudinal axis of the channel, would exhibit a central low-pressure zone, in which dust could move towards the laser unit. Preferably, the cross-section is polygonal. To counteract any formation of wake regions close to the channel walls, particularly in the corners of the polygon, it is preferred that jet-generating openings are formed in a side wall portion of the channel, preferably at the corners. Each jet-generating opening has a shape and location to provide for a gas flow along a periphery portion of the channel towards the processing area.

BRIEF DESCRIPTION OF THE DRAWINGS

In the following, a presently preferred embodiment of the invention will be described, reference being made to the accompanying schematic drawings.

DESCRIPTION OF PREFERRED EMBODIMENTS

Figure 1:
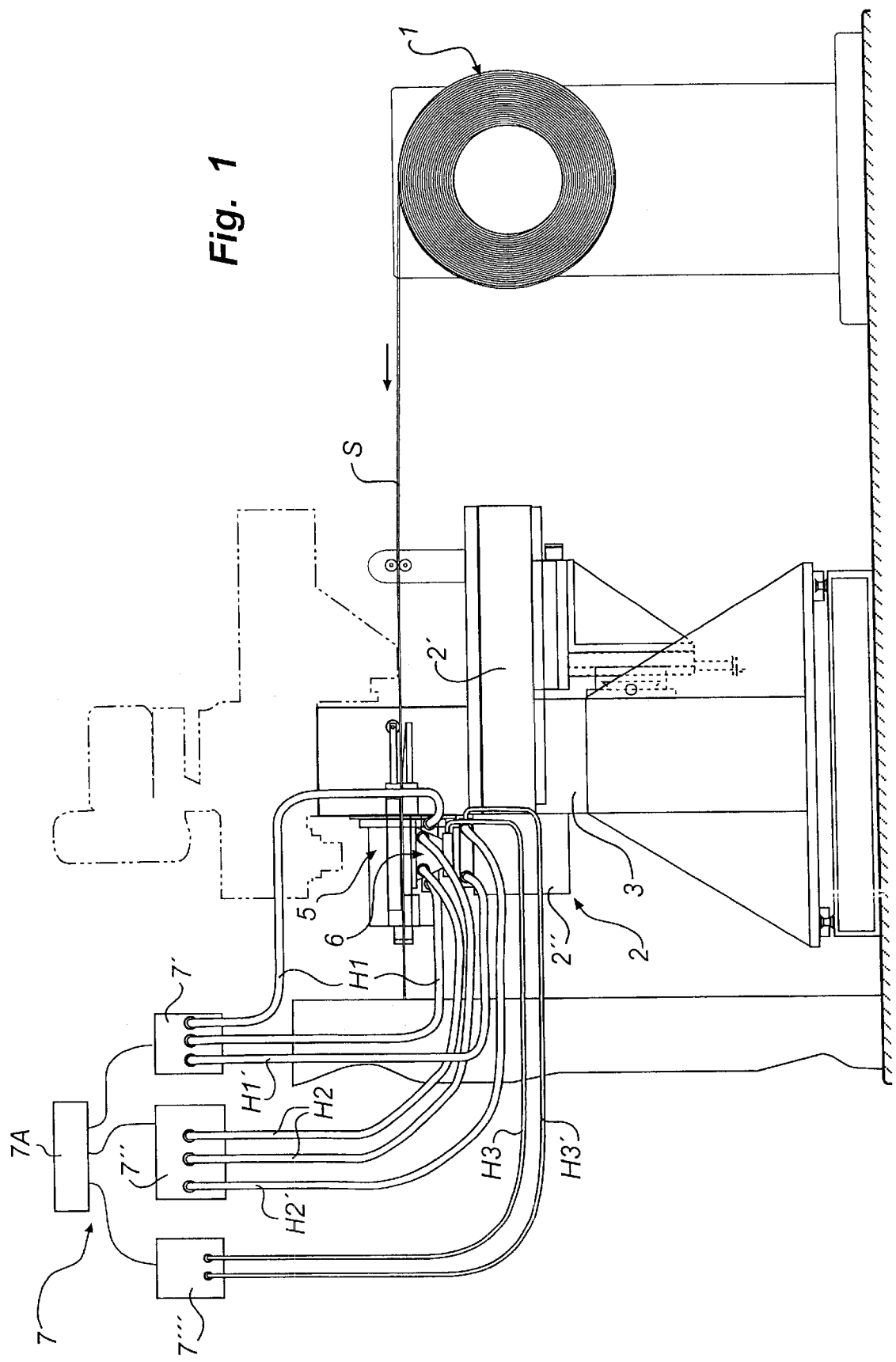
FIG. 1 is a side view of a laser engraving apparatus in a system for manufacturing opening tabs for can ends, the laser engraving apparatus including a dust protection device according to the invention.

FIG. 1 shows part of a system for manufacture of marked tabs or opening rings to be included in ends for beverage cans (not shown). A thin metal strip S is fed from a supply 1 to a laser unit 2 supported by a supporting member 3, and finally fed to a tab forming unit 4 which is of a type known per se and which forms tabs by punching and stamping the strip S (see for instance the pamphlet "This is PLM Fosie" issued by Applicant's company PLM Fosie AB in the mid nineties). The strip S is guided by a guiding device 5 when passing the laser unit 2, and fed from the supply 1 by a feeding means (not shown) arranged in association with the tab forming unit 4. The laser unit 2 is of a high-power and high-speed type and is capable of providing engravings or markings in the surface of the strip S. This laser unit 2 comprises a laser head 2', which is adapted to generate laser radiation at a suitable wavelength, and a so-called scanner head 2", which is adapted to receive the laser radiation from the laser head 2' and focus and direct the generated radiation to a given location on the surface of the strip S. Thus, a laser processing area S' (FIGS. 2–4) is formed at the surface of the strip S.

Since the tab surface available for the markings is very small, the laser radiation must be accurately positioned on the strip S, and the strip S must be also be accurately positioned during the laser engraving operation. In general, the strip S is made of aluminum with a thickness of about 0.24 mm and a width of about 67 mm. Such a strip S will flex even when relatively small forces are applied to its surface.

Intermediate the scanner head 2" and the guiding device 5, there is provided a dust protection device 6. The dust protection device 6 is in fluid communication with a unit 7 controlling and effecting simultaneous feeding and removal of air to and from the dust protection device 6, as will be further described below with reference to FIGS. 2–4. The air control unit 7 comprises a main control device 7A, such as a computer, an air pumping device 7', such as a fan or pump, an air sucking device 7", such as a fan or pump, and a high-pressure device 7'", such as a compressor. The main control device 7A could also be connected to one or more pressure sensors, as will be further described below.

Figure 2:
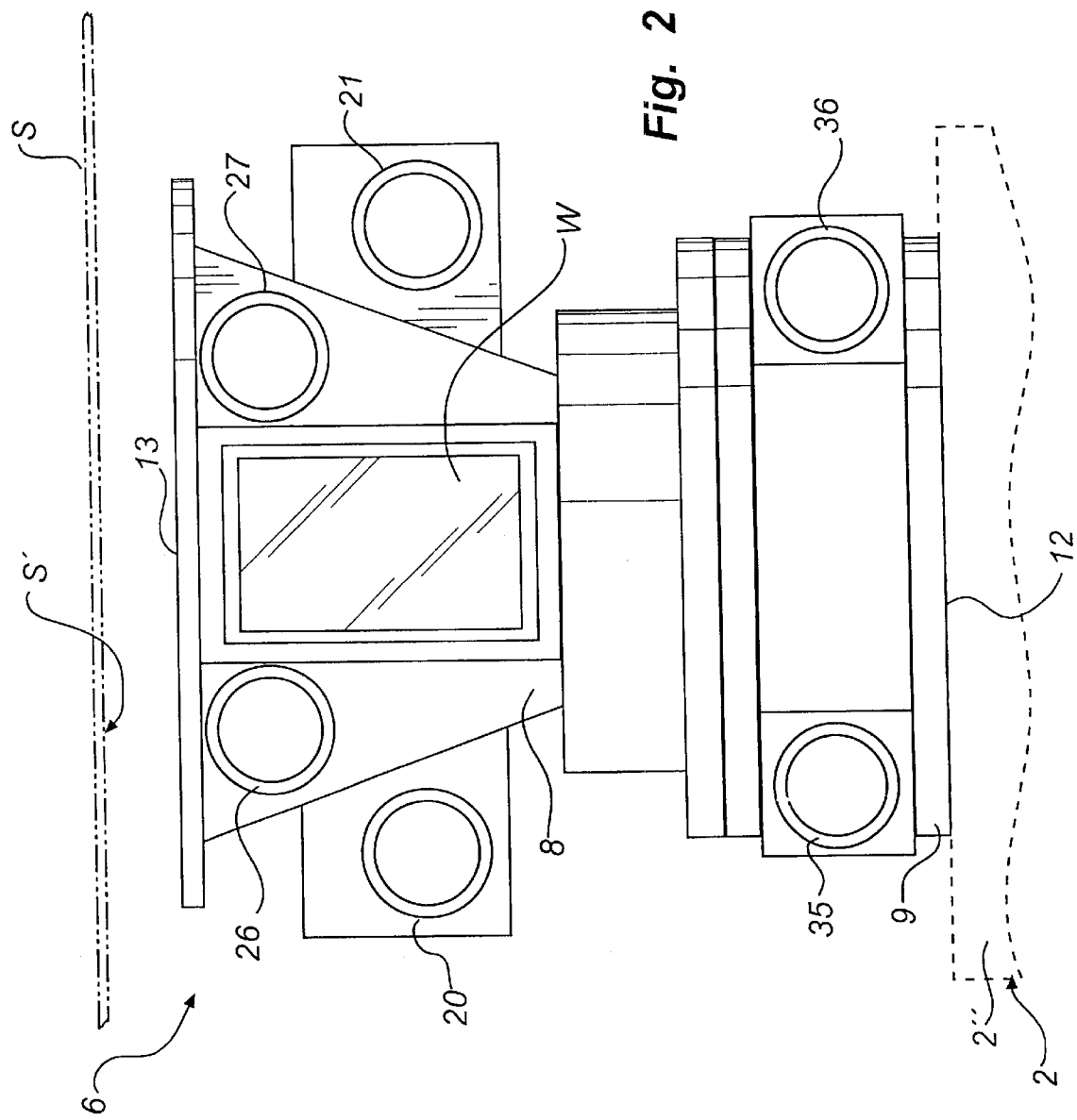
FIG. 2 is a side view of the dust protection device of FIG. 1.
Figure 3:
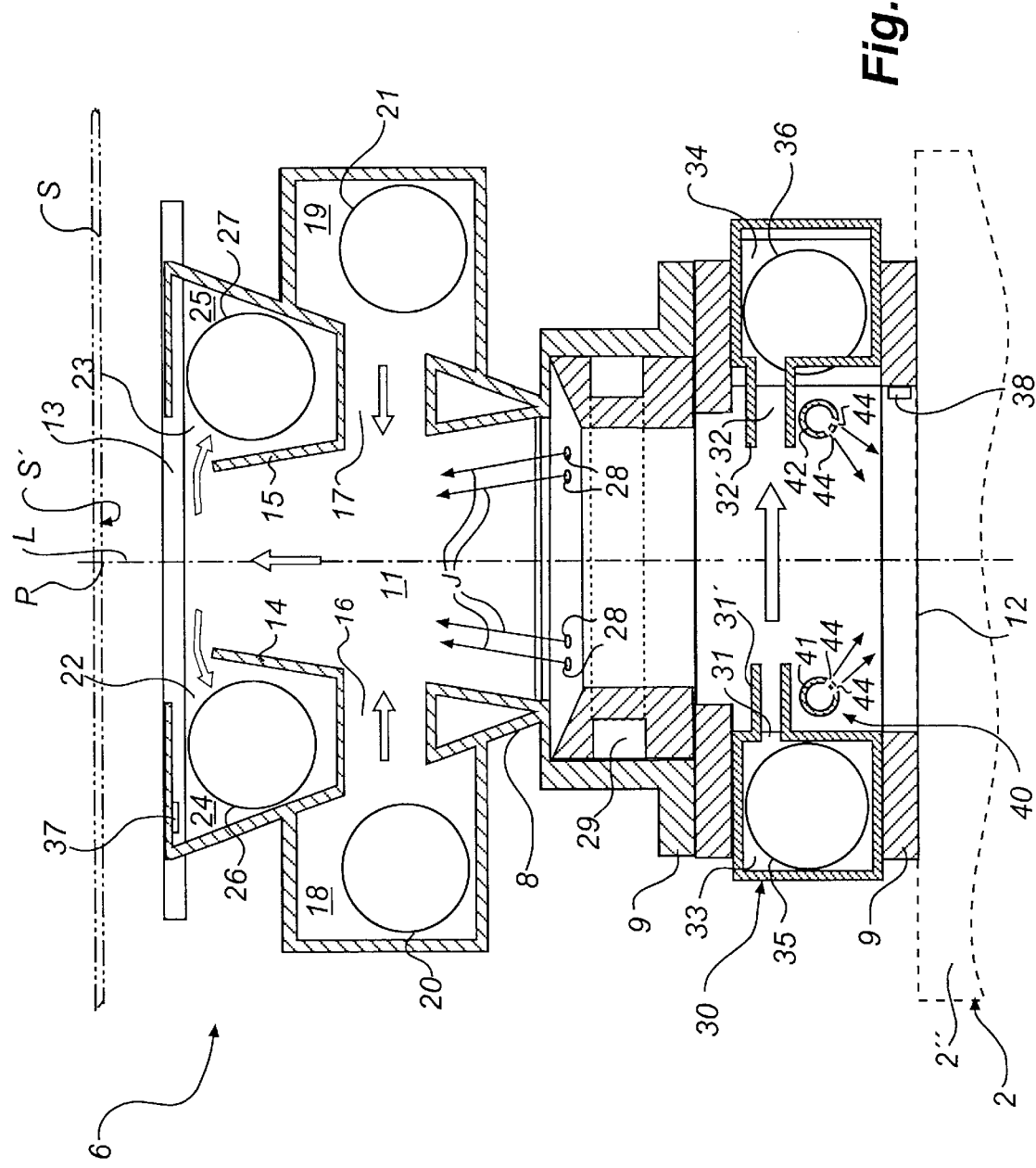
FIG. 3 is a cross-sectional view taken along the center line of the dust protection device of FIG. 2.
Figure 4:
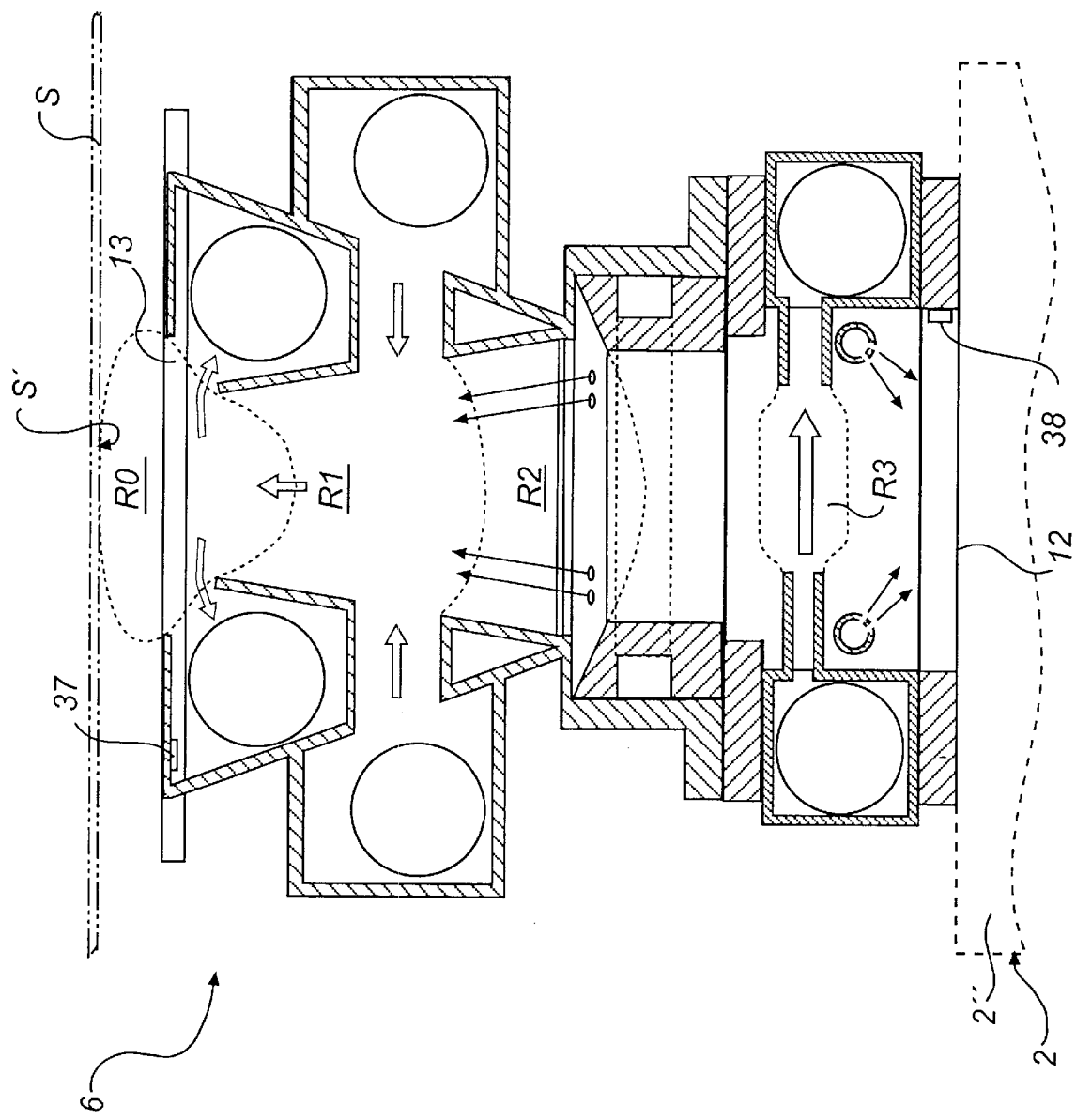
FIG. 4 corresponds to FIG. 3 and schematically indicates regions of different gas characteristics in the interior of the dust protection device.

As shown in more detail in FIGS. 2–4, the dust protection device 6 comprises a housing 8 having a flange 9 at a first end to be directly fastened to the scanner head 2" (indicated with ghost lines in FIGS. 2–4), by means of bolts or the like (not shown) extending through holes (not shown) in the flange 9. A longitudinal channel 11 extends from a radiation inlet opening 12 at the first end to a radiation outlet opening 13 at an opposite second end. When installed, the radiation outlet opening 13 faces the processing area S', and radiation is transmitted through the channel 11 between the scanner head 2" and the surface of the strip S (indicated with ghost lines in FIGS. 2–4). The housing 8 has an inspection window W to allow for inspection of the channel 11 during operation of the dust protection device 6. The second end may or may not be connected to the guiding device 5 (only shown in FIG. 1). The distance from the radiation outlet opening 13 to the strip surface is generally less than one or two centimeters.

Figure 6:
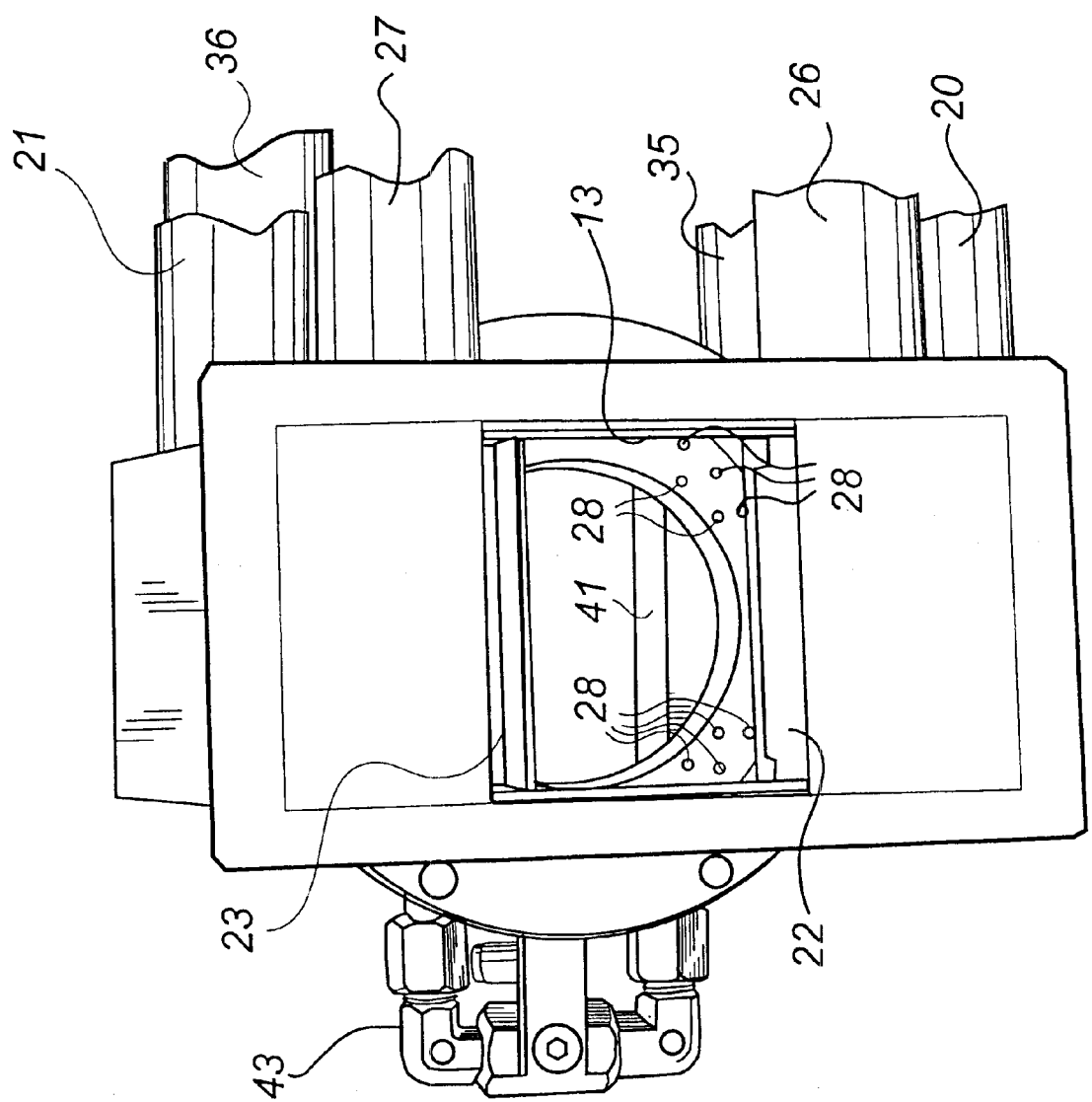
FIG. 6 is a slightly inclined end view of the dust protection device of FIG. 5.

As shown in FIG. 3, two opposite air inlet openings or apertures 16, 17 are formed in a side wall portion of the channel 11. In the illustrated embodiment, as shown in FIG. 6, the channel 11 is delimited by four side walls and has a generally square or rectangular cross-section in the lateral direction. The air inlet openings 16, 17, which are mutually identical in shape and dimensions, extend across one respective side wall 14, 15 of the rectangular channel 11. The openings 16, 17 communicate with a respective air inlet chamber 18, 19, each having a spigot 20, 21 for connection to the air pumping device 7' by means of hoses H1 or the like (FIG. 1).

Also referring to FIG. 3, two opposite air outlet openings or apertures 22, 23 are formed in the side walls 14, 15 adjacent to the radiation outlet opening 13. The air outlet openings 22, 23, which are mutually identical in shape and dimensions, extend across one respective side wall 14, 15 of the rectangular channel 11. The openings 22, 23 communicate with a respective air outlet chamber 24, 25, each having a spigot 26, 27 for connection to the air sucking device 7" by means of hoses H2 or the like (FIG. 1).

In operation, the air pumping device 7' continuously and symmetrically feeds air to the air inlet openings 16, 17. Thus, two opposite symmetrical air flows, laterally directed towards the center of the channel 11, as shown by arrows in FIG. 3, are set up through the air inlet openings 16, 17. Simultaneously, air is symmetrically sucked in two opposite directions, as shown by arrows in FIG. 3, from the region close to the radiation outlet opening 13 through the two opposite air outlet openings 22, 23. Thus, the air sucking unit 7" continuously sucks air through the air outlet openings 22, 23, thereby establishing a region R0, schematically indicated in FIG. 4, of essentially ambient pressure. Thus, ambient pressure is established at the radiation outlet opening 13 and at the processing area S'. The air flows entering through openings 16, 17 meet and form, in a region R1 indicated in FIG. 4, a combined air flow in the longitudinal or vertical direction towards the radiation outlet opening 13 and the processing area S'. Since the openings 16, 17 extends over a respective side of the rectangular channel 11, the longitudinal air flow is established over essentially the whole cross-section of the channel.

In the illustrated embodiment, the channel walls 14, 15 in region R1 are inclined towards the center line L of the channel 11 so that the cross-section continuously decreases towards the radiation outlet opening 13. In this configuration, the longitudinal air flow is accelerated towards the radiation outlet opening 13 in region R1. This has been found to improve the ability of the device 6 to protect the scanner head 2" from dust produced at the processing area S'.

For optimum performance, it has been found that the air outlet openings 22, 23 should be inclined towards the center line L, preferably at angle of about 30–60°, so that the openings 22, 23 to some extent face the radiation outlet opening 13. This has been found to enhance the ability to remove dust from the processing area, as well as the ability to establish an essentially uniform and ambient pressure in region R0 at the opening 13. To further promote the uniformity of the pressure distribution in region R0, the total surface area of the openings 22, 23 should be about ⅔ of the surface area of the radiation outlet opening 13.

As indicated in FIG. 4, a region R2 of stagnant air at a comparatively high pressure is established in the channel 11, immediately beneath region R1. Thus, a pressure barrier is established in region R2, i.e. a pressure gradient of increasing pressure towards the radiation inlet opening 12. This pressure barrier assists in preventing dust from reaching the scanner head 2".

Figure 5:
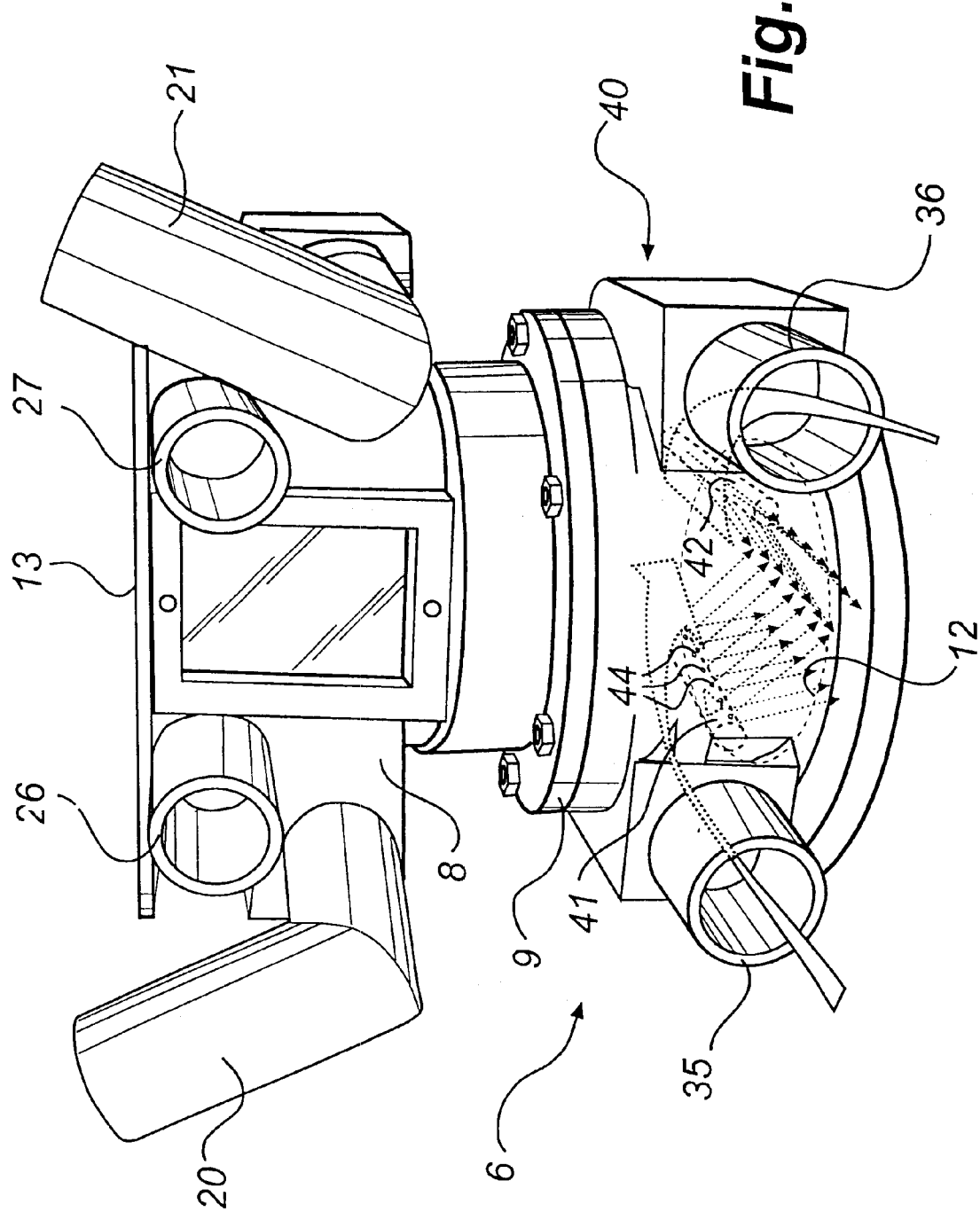
FIG. 5 is a perspective view of the dust protection device of FIGS. 2–4.

In some channel geometries, wake regions can be formed, particularly in any corners of the channel 11. In such wake regions, or stagnant regions, dust might slide along the walls of the channel 11, thereby passing region R1. To this end, as illustrated in FIGS. 2 and 6, a number of jet-generating passages 28, which open into the channel 11, are provided between the radiation inlet opening 12 and the air inlet openings 16, 17. The passages 28 are arranged to form jets J that are directed towards a central point P in the processing area S', i.e. on the strip surface, as indicated by single line arrows in FIGS. 3 and 4. More specifically, five passages 28 are formed at each lateral corner of the channel 11, as shown in FIG. 5. The twenty passages 28 communicate with a common ring-shaped chamber 29 which is connectable to the high-pressure device 7''' of the air control unit 7, for example by means of a hose H3 (FIG. 1). Due to an inherent spread in the generated air jets J, a flow of air will be established along the channel walls. This peripheral flow of air will eliminate the above-mentioned wake regions. The jets J have the additional function of breaking away dust particles formed at the processing area S' during the engraving operation.

The dust protection device according to the preferred embodiment of FIGS. 1–6 comprises an auxiliary dust protection arrangement 30. This arrangement 30 sets up a lateral sheet of air across the full cross-section of the channel 11 in a region R3 (indicated in FIG. 4) intermediate the region R2 and the radiation inlet opening 12. This lateral sheet of air is arranged to capture and remove any dust that passes the regions R1 and R2, for example heavy particles. As shown in FIG. 3, two opposite openings or apertures 31, 32 are formed in a side wall portion of the channel 11. The openings 31, 32, extend across one respective side wall of the rectangular channel 11. The openings 31, 32 communicate with a respective air chamber 33, 34, each having a spigot 35, 36 for connection to the air control unit 7 by means of a respective hose H1', H2' or the like (FIG. 1). The opening 31 is connected to the pumping device 7' and has a delivery snout 31' extending into the channel 11. The opening 32 is connected to the air sucking device 7" and has a reception snout 32' extending into the channel 11. The delivery snout 31' is designed to form the entering air into a lateral sheet, and the reception snout 32', being slightly larger in the longitudinal direction, is designed to receive essentially all air leaving the snout 31'. In operation, the air feed and removal rates through the openings 31, 32 are essentially balanced, so that the lateral air flow is established with minimum interaction with the other regions R0–R2 in the channel 11.

The embodiment shown on the drawings has been used in a laser processing apparatus with satisfactory results. Here, the air pumping device 7' delivers air at a rate of approximately 10,000–30,000l/min to the openings 16, 17, 31, equally distributed between the three. The high pressure device 7'" feeds air at a pressure of 0.15–0.4 MPa (1.5–4 bar) to the ring-shaped chamber 29, thereby equally distributing air to the jet-generating passages 28, each having a diameter of approximately 1.5 mm. Simultaneously, the air sucking device 7" is controlled by means of the main control device 7A to remove air from the openings 22, 23, 32. The air flows are controlled in such manner that essentially ambient pressure is established at the radiation outlet opening 13, and thereby also at the processing area S' on the strip S. In one embodiment, this is done without feed-back control by simply balancing the air flows entering and leaving the housing 8. In another embodiment, the removal of air is actively controlled by the control unit 7A based on the output of one or more pressure sensors (the sensors 37, 38 in FIG. 3), which are arranged in association with the channel 11. Alternatively, all air flows into and out of the housing 8 could be individually and actively controlled by the control device 7A.

The amount of pressure deviation from ambient that can be tolerated at the opening 13 depends on the type of target. With the present target, the pressure at the radiation outlet opening 13 is preferably controlled within ±1 kPa (±10 mbar) of ambient, in order not to undesirably affect the position or shape of the strip S during the engraving operation.

As shown in FIGS. 3–6, the dust protection device 6 includes a supplementary cleaning arrangement 40. The cleaning arrangement 40 is provided at the first end of the housing 8, i.e. facing the scanner head 2". The cleaning arrangement 40 comprises two lateral, hollow pipes 41, 42 which are connected to an exterior coupling 43 (FIG. 6) of the housing 8. The coupling 43 is in turn connected to the high pressure device 7'" by means of a hose H3' or the like (FIG. 1). In the periphery of each pipe 41, 42, there is provided one or more rows of holes 44. Each row of holes 44 is offset with respect to the lateral direction, thereby being capable of directing air towards the radiation inlet opening 12, to remove any dust deposited on the scanner head 2". Preferably, the air control unit 7 is operated to intermittently feed air through the cleaning arrangement 40, so that air is emitted in short bursts from the rows of holes 44 (FIG. 5). The cleaning arrangement 40 is advantageously used whenever dust might have been deposited on the scanner head 2", for example when restarting the laser engraving apparatus after a shut-down or breakdown in production.

The dust protection device 6 can be modified in numerous ways without departing from the scope defined in the appended claims. For example, any number of openings could be provided to generate the longitudinal air flow in region R1 and the lateral air flow in region R3. Also, further air outlet openings could be provided to improve the pressure control at the radiation outlet opening 13. Likewise, a different arrangement of the air openings might be used to achieve the desired flow distribution within the channel 11. The above also applies to the jet-generating openings 28.

It should be appreciated that the air control unit 7 might include some kind of filter (not shown) to remove dust particles in the air flow from the dust protection device 6. Further, other gases than air might be used.

In addition to the dust protection device 6 described above, the invention also relates to a method of protecting a laser unit 2 from dust during laser processing of a target, in this embodiment a strip S, in a processing area S'. In its broadest aspect, this method comprises the steps of establishing an essentially ambient pressure at the processing area S', and establishing, in region R1 intermediate the processing area S' and the laser unit 2, a longitudinal gas flow which is directed towards the processing area S'.

It should also be appreciated that the inventive device and method could be used in protecting other types of marking units for non-mechanical processing of targets.

What is claimed is:

1. A method of protecting a laser unit from dust during laser processing of a target in a processing area, comprising:
   establishing an essentially ambient pressure at said processing area;
   establishing, in a first region intermediate said processing area and said laser unit, a longitudinal gas flow that is directed towards said processing area;
   simultaneously feeding gas to said first region intermediate said processing area and said laser unit; and
   removing gas adjacent to the processing area.

2. A method according to claim 1, wherein pressure at the processing area is maintained within ±1 kPa relative to the ambient pressure.

3. A method according to claim 1, wherein said longitudinal gas flow is accelerated towards said processing area.

4. A method according to claim 1, wherein said first region is located within a channel of a housing arranged intermediate said laser unit and said processing area, said channel extending between a radiation inlet opening and a radiation outlet opening of said housing, said method further comprising:
   simultaneously feeding gas to and removing gas from said channel at separated locations therein, an amount of gas fed to said channel being approximately equal to an amount of gas removed from said channel.

5. A method according to claim 4, wherein said longitudinal gas flow is established over essentially a full cross-section of the channel and is directed towards the radiation outlet opening.

6. A method according to claim 4, wherein gas is fed into said first region in at least one pair of diametrically opposite inlet gas flows that cooperate to form said longitudinal gas flow directed towards said processing area.

7. A method according to claim 6, wherein said opposite inlet gas flows on entering said channel are directed essentially perpendicular to a longitudinal center line of said channel.

8. A method according to claim 6, wherein said opposite inlet gas flows together sweep a full cross-section of said channel.

9. A method according to claim 4, further comprising separately establishing a peripheral gas flow along a periphery portion of the channel in said first region, said peripheral gas flow being directed towards said processing area.

10. A method according to claim 9, wherein at least one gas jet is generated and directed towards said processing area, to establish said peripheral gas flow.

11. A method according to claim 4, wherein gas is removed adjacent to said radiation outlet opening.

12. A method according to claim 11, wherein gas is removed in at least two diametrically opposite directions.

13. A method according to claim 4, further comprising establishing, in a third region in said channel, a lateral gas flow between opposite openings in a side wall portion of said channel.

14. A method according to claim 13, wherein said third region is established intermediate said first region and said laser unit.

15. A method according to claim 13, wherein said lateral gas flow sweeps a full cross-section of said channel.

16. A method according to claim 13, wherein said lateral gas flow is essentially perpendicular to a longitudinal center line of said channel.

17. A method according to claim 13, wherein gas is being fed into and removed from said channel through said opposite openings at essentially equal rates.

18. A method according to claim 4, further comprising measuring the pressure in at least one position within said housing, and based on the thus measured pressure controlling the removal of gas from said housing.

19. A method according to claim 4, further comprising establishing a pressure barrier in a second region in said channel.

20. A method according to claim 19, wherein said second region is established intermediate said first region and said laser unit.

21. A dust protection device for a laser processing apparatus, said dust protection device comprising:
    a channel that extends from a radiation inlet opening to a radiation outlet opening, the channel transmitting radiation from a laser unit to a processing area of the laser processing apparatus; and
    a gas control unit arranged in fluid communication with said channel, said gas control unit being controllable to establish, in a first region intermediate said radiation outlet opening and said radiation inlet opening, a longitudinal gas flow that is directed towards said radiation outlet opening, as well as an essentially ambient pressure at said radiation outlet opening, wherein said gas control unit is adapted to simultaneously feed gas to and remove gas from said channel in essentially equal amounts.

22. A dust protection device according to claim 21, further comprising at least one pressure sensor that is located in association with said channel to provide pressure data, wherein the gas control unit is adapted to control the removal of gas through said at least one gas outlet aperture based on said pressure data.

23. A dust protection device according to claim 21, wherein said channel has non-circular cross-section, at least in said first region.

24. A dust protection device according to claim 21, further comprising jet-generating openings that are formed in a third side wall portion of said channel, said gas control unit being controllable to feed gas through said jet-generating openings to generate gas jets directed towards said radiation outlet opening, wherein each jet-generating opening has a shape and location to provide for a peripheral gas flow along a periphery portion of the channel, at least in said first region.

25. A dust protection device according to claim 24, wherein said jet-generating openings are formed at corners of the third side wall portion of said channel.

26. A dust protection device according to claim 24, wherein the cross-section of said channel has the shape of a polygon and at least one of said jet-generating openings is arranged at each corner of said polygon.

27. A dust protection device according to claim 26, wherein the cross-section of said channel is square-shaped.

28. A dust protection device according to claim 21, wherein the channel has a decreasing cross-section towards said radiation outlet opening, at least in said first region, so that said longitudinal gas flow is accelerated towards the radiation outlet opening.

29. A dust protection device according to claim 21, wherein the gas control unit is adapted to maintain the pressure at the radiation outlet opening within ±1 kPa relative to the ambient pressure.

30. A dust protection device according to claim 21, further comprising at least one gas outlet aperture in a first side wall portion of said channel adjacent to said radiation outlet opening, and at least one gas inlet aperture in a second side wall portion spaced from said radiation outlet opening, said gas outlet and inlet apertures being connected to said gas control unit, which is controllable to feed gas to said at least one gas inlet aperture and to remove gas from said at least one gas outlet aperture.

31. A dust protection device according to claim 30, further comprising at least one pair of gas inlet apertures which are adapted to generate at least one pair of diametrically opposite gas flows that cooperate to form said longitudinal gas flow directed towards said radiation outlet opening.

32. A dust protection device according to claim 31, wherein said opposite gas flows are controlled to form a pressure barrier in a second region intermediate said first region and said radiation inlet opening, when the latter is connected to the laser unit.

33. A dust protection device according to claim 31, wherein said opposite gas flows on leaving said pair of gas inlet apertures are directed essentially perpendicular to a longitudinal center line of said channel.

34. A dust protection device according to claim 31, wherein said gas inlet apertures are formed such that said opposite gas flows together sweep a full cross-section of said channel, so that said longitudinal gas flow is established over essentially a full cross-section of the channel.

35. A dust protection device according to claim 34, wherein a cross-section of said channel is substantially square-shaped, and each of said gas inlet apertures extends along one respective side of said square-shaped channel.

36. A dust protection device according to claim 30, comprising at least one pair of gas outlet apertures arranged diametrically opposite to one another adjacent to said radiation outlet opening.

37. A dust protection device according to claim 36, wherein said gas outlet apertures are inclined towards said radiation outlet opening.

38. A dust protection device according to claim 36, wherein a total surface area of said gas outlet apertures facing the radiation outlet opening is approximately ⅔ of a surface area of the radiation outlet opening.

39. A dust protection device according to claim 21, further comprising at least one gas inlet opening and at least one opposite gas outlet opening in a third region in said channel, said gas control unit being controllable to feed gas to said at least one gas inlet opening and to remove gas from said at least one gas outlet opening, to establish in said third region a lateral gas flow which is essentially perpendicular to a longitudinal center line of said channel.

40. A dust protection device according to claim 39, wherein said third region is located intermediate said first region and said radiation inlet opening.

41. A dust protection device according to claim 39, wherein said gas inlet and outlet openings are formed such that said lateral gas flow sweep a full cross-section of said channel.

42. A dust protection device according to claim 39, wherein said gas control unit is adapted to simultaneously feed gas to and remove gas from said gas inlet and outlet openings, respectively, in essentially equal amounts.

43. A laser processing apparatus comprising a laser unit, a guiding unit for guiding a target past a processing area at said laser unit, and a dust protection device according to claim 21, wherein the dust protection device is arranged intermediate said laser unit and said guiding unit.

\* \* \* \* \*